Dec. 4, 1928.
G. D. ANGLE
1,693,882
CRANKSHAFT OIL PLUG
Filed June 2, 1925
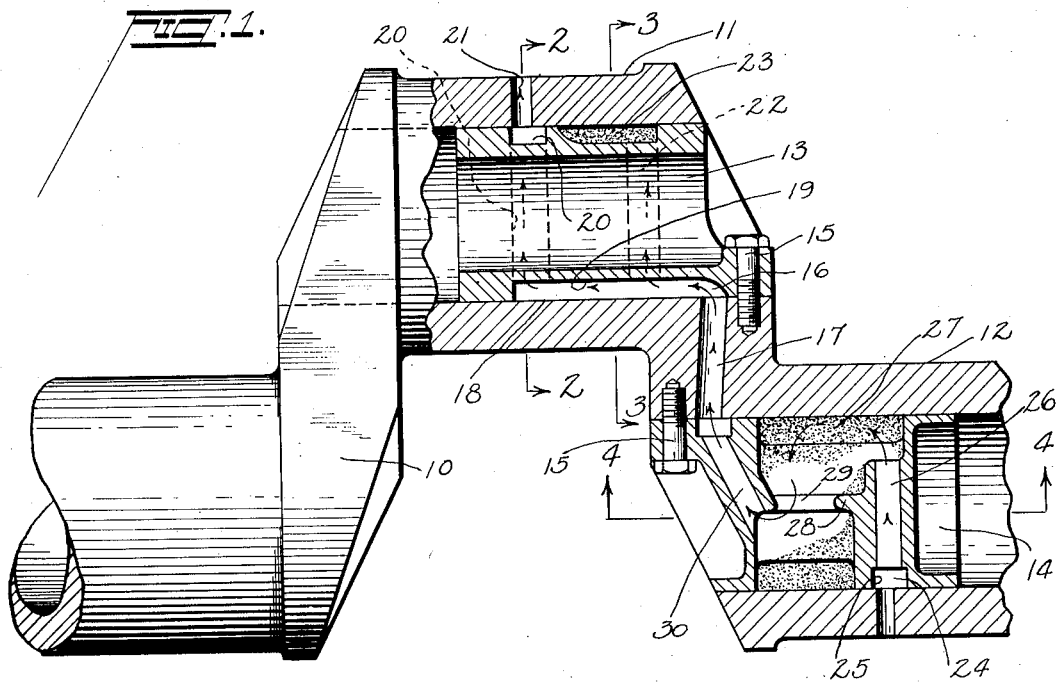
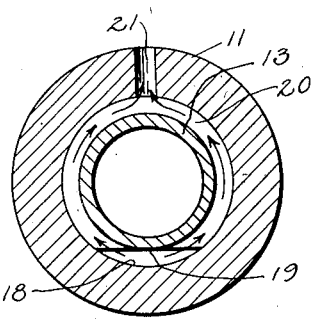
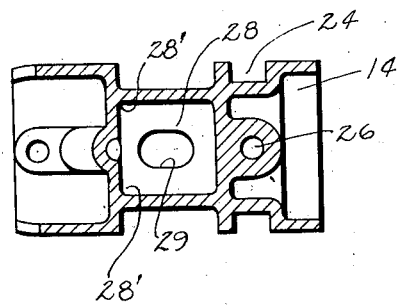
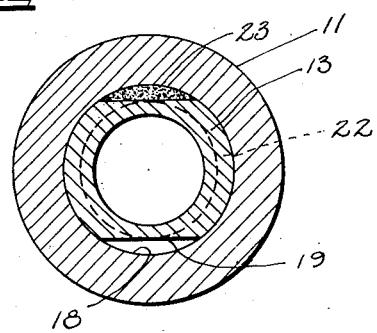
INVENTOR
GLENN D. ANGLE
BY
ATTORNEY Patented Dec. 4, 1928.

1,693,882

UNITED STATES PATENT OFFICE.

GLENN D. ANGLE, OF DETROIT, MICHIGAN, ASSIGNOR TO DETROIT AIRCRAFT ENGINE CORPORATION, OF DETROIT, MICHIGAN, A CORPORATION OF MICHIGAN.

CRANK-SHAFT OIL PLUG.

Application filed June 2, 1925. Serial No. 34,407.

This invention relates to improvements in the lubrication of crankshafts for internal combustion engines, and particularly to engines having a high rate of speed such as are in general use in present day aircraft.

It has for its principal object the provision of means for automatically cleaning the lubricant of foreign matter in its passage through the crankshaft of an engine by the action of centrifugal force, by means of a chambered plug incorporated in the embodiment of my invention, as will hereinafter be described.

Another object of my invention is the provision for easily removing the sediment collected without the necessity of removing the entire lubrication system.

Various other advantages and objects of my invention will appear in the following specification and attached drawing the novel features of which are pointed out in the appended claims. In the drawings Figure 1 is a view of a portion of a crankshaft partly in section.

Fig. 2 is a section taken on the line 2—2 of Fig. 1.

Fig. 3 is a section taken on the line 3—3 of Fig. 1.

Fig. 4 is a section taken on the line 4—4 of Fig. 1.

Referring more particularly to the drawings, 10 designates a crankshaft generally comprising crank pins 11 and journals 12 and having an oil passage there through as is indicated by the arrows. The crank pins and journals are bored to receive plugs 13 and 14 respectively which are two embodiments of my invention, both being locked in position to guard against rotational or endwise movement by machine screws 15.

The plug 13 is substantially cylindrical in shape and comprises an intake portion 16 communicating with the supply passage 17 in the crankshaft, said intake portion being formed by the inner wall 18 of the crank pin 11 and the flat outer face 19 of the plug 13 shown in Fig. 2. Communicating with the intake portion 16 and at the opposite end of the plug 13 is a grooved exhaust portion 20 which circulates the lubricant around the periphery of the plug and exhausts it out thru the passage 21 at the opposite side of the crankpin 11. Communicating with the intake position 16 thru a grooved passage 22 is a chamber 23 located remote from the axis of rotation of the plug so that it catches and retains the foreign matter or sediment in the lubricant thru the action of centrifugal force. The chamber 23 is also formed by the inner wall of the crankpin 11 and the opposite outer flat face of the plug 13 making it possible to remove the plug and clean the sediment lodged therein with very little difficulty. It will be evident that while the lubricant is being supplied through entrance 16 and along the plug between the wall 18 of the crankpin and wall 19 of the plug, any heavy foreign matter such as sediment, chips of bearings, etc., will be thrown outwardly so that they will enter the channel or groove 22 when they reach that point, and travel outwardly along the groove as far as possible, meanwhile displacing the oil in the groove. The sediment will thus be collected in the chamber 23 and retained therein even after the crankshaft is stopped, since the foreign matter becomes packed and too thick to be released until manually removed.

The plugs 13 and 14 are cast from a metal having a larger coefficient of expansion than that of the crankshaft, so that when the engine is functioning and the lubricant becomes heated, the plugs will expand sufficiently to provide a tight fit and thereby prevent seepage of the lubricant. As a result very little care is required in fitting the plug because of its expansion under these conditions. The passages in the plugs are so arranged that a minimum quantity of lubricant is carried between the plugs and the crankshaft. This feature has the advantage of delivering the lubricant thru the plug too rapidly to absorb much heat from the surrounding metal, and of its consequent delivery to the bearing surface in a comparatively cool state.

A preferred modification of the plug shown at 14 in Fig. 1 is provided with an intake portion 24 located near one end of the plug which portion consists of a grooved passage 25 extending partly around one side of the plug, and a circular passage 26 extending radially to conduct the lubricant from the intake portion to an intermediate chamber 27 located remotely from the axis of rotation of the plug where the sediment and other heavier substances are collected and retained. The bottom of the chamber 27 is formed by a wall 28 having a substantially round opening 29 so as to provide pockets 28' for the sediment. The wall 29 is located at the center of rotation of the plug and forms an opening through which the lubricant passes out and into the exhaust passage 30 and thence through the supply passage 17 and into the succeeding bearing.

In the form of a plug shown in Fig. 4. it will be evident that the lubricant in passing through the plug must flow to a point remote from the axis of the plug and consequently remote from the axis of rotation even when used in conjunction with a main bearing of the shaft. The lubricant is then constrained to flow inwardly radially from such an outward location and consequently the solid undesired foreign matter in the lubricant will be assured of remaining where it is most remote from the axis of rotation. The chamber at 27 is not clogged since the opening 29 is large and centrally positioned and the entrance to the chamber is likewise a considerable distance from the outer limits of the chamber.

While I have shown in the accompanying drawing and description the preferred embodiment of my invention, I do not wish to be limited thereto, but aim to cover in the appended claims all modifications falling fairly within the scope of my invention.

I claim:

1. In combination, a shaft, a bearing surface, a bearing for said surface, a removable plug adapted to be inserted in said shaft adjacent said bearing surface, a passage in said plug for carrying lubricant to said bearing and bearing surface, and a chamber in said plug for retaining the foreign matter in said lubricant.

2. In combination, a shaft, a bearing surface, a bearing for said surface, a removable plug adapted to be inserted in said shaft adjacent said bearing surface, a passage in said plug for carrying lubricant to said bearing and bearing surface, and a chamber in said plug substantially removed from the shaft axis for retaining the foreign matter in said lubricant, said chamber being adjacent to and connected with the lubricant passage in said plug.

3. In combination, a crankshaft having a bearing surface, a bearing for said surface, a removable plug adapted to be inserted in said shaft, said plug having a passage of comparatively small capacity for the delivery of the lubricant to the bearing surface in a comparatively cool state, a chamber in said plug substantially removed from the shaft axis to cause any heavy foreign matter in the lubricant to be displaced outwardly by centrifugal force and retained in the said chamber.

4. In combination, a crankshaft having a bearing surface, a bearing for said surface, a removably plug adapted to be slidably inserted in said shaft, retaining means for said plug to prevent movement of said plug, the plug material having a larger coefficient of expansion than the crankshaft material, whereby said relative difference in expansion provides leakproof fit between the said plug and said crankshaft to cause an unrestricted flow of lubricant through the said plug after normal operating temperature has been attained.

5. In combination, a shaft, a bearing surface, a bearing for said surface, a removable plug adapted to be inserted in said shaft adjacent said bearing surface, a passage in said plug for carrying lubricant to said bearing and bearing surface, and a chamber in said plug substantially removed from the shaft axis, said chamber being adjacent to and connected with the lubricant passage in said plug, having a restricted outlet to form a pocket to retain the foreign matter in said lubricant.

6. In a crankshaft, a plug, a passage for lubricant in said plug, a chamber in said plug spaced from the center of rotation formed by a plurality of spaced walls therein and the inner side of said crankshaft for centrifugally removing the sediment or other foreign substance from said lubricant and retaining it in said chamber.

7. In a crankshaft for internal combustion engines having a lubricant supply passage therein, a substantially cylindrical plug in said crankshaft having a passage communicating with said supply passage, said second passage consisting of an entrance portion to supply lubricant to said plug at a point adjacent one end thereof, an exit portion to discharge said lubricant from said plug at a point adjacent the opposite end of the plug, and an intermediate enlarged portion located remotely from the axis of rotation of said plug to collect and retain sediment from said lubricant by the action of centrifugal force.

8. In a crankshaft for internal combustion engines having a pressure fed lubricant supply passage therein, a substantially cylindrical plug in said crankshaft having a passage communicating with said supply passage, said second passage consisting of an intake portion to supply lubricant to said plug at a point adjacent one end thereof, said intake portion extending across the plug to the opposite side thereof, an exhaust portion in said plug to discharge said lubricant from said plug at a point adjacent the opposite end thereof, an intermediate portion communicating with said intake portion and said exhaust portion, said intermediate portion located at a point remote from the axis of rotation of said plug and on the opposite side of said plug from said intake portion said intermediate portion comprising a chamber formed by a plurality of spaced parallel walls in said plug and the inner side of said crankshaft to collect and retain sediment from said lubricant by the action of centrifugal force, said chamber having a restricted outlet at the center of the plug, to form a pocket to retain the sediment held by said chamber.

In testimony whereof I affix my signature.

GLENN D. ANGLE.